United States Patent
Lucca

(10) Patent No.: US 12,120,367 B2
(45) Date of Patent: Oct. 15, 2024

(54) AUTOMATED NETWORK ORCHESTRATION

(71) Applicant: Disney Enterprises, Inc., Burbank, CA (US)

(72) Inventor: Chyloe F. Lucca, Canton, CT (US)

(73) Assignee: Disney Enterprises, Inc., Burbank, CA (US)

( * ) Notice: Subject to any disclaimer, the term of this patent is extended or adjusted under 35 U.S.C. 154(b) by 117 days.

(21) Appl. No.: 17/477,386

(22) Filed: Sep. 16, 2021

(65) Prior Publication Data
US 2023/0078252 A1  Mar. 16, 2023

(51) Int. Cl.
| H04N 21/24 | (2011.01) |
| H04N 21/2187 | (2011.01) |
| H04N 21/443 | (2011.01) |
| H04N 21/488 | (2011.01) |

(52) U.S. Cl.
CPC ..... *H04N 21/2404* (2013.01); *H04N 21/2187* (2013.01); *H04N 21/4431* (2013.01); *H04N 21/4884* (2013.01)

(58) Field of Classification Search
CPC ........... H04N 21/4884; H04N 21/4431; H04N 21/2187; H04N 21/2404
See application file for complete search history.

(56) References Cited

U.S. PATENT DOCUMENTS

| 9,235,444 B2* | 1/2016 | Dai ........................ G06F 12/02 |
| 9,569,467 B1* | 2/2017 | Schechter ............... G06F 16/27 |
| 9,973,785 B1* | 5/2018 | Yang .................. H04N 21/8352 |
| 10,411,947 B2 | 9/2019 | Rangasamy et al. |
| 10,862,733 B2 | 12/2020 | Jaeger |
| 2009/0234903 A1* | 9/2009 | Lomelli ................ G06F 9/5055 709/201 |
| 2010/0026811 A1* | 2/2010 | Palmer ................ G06F 11/2033 348/E7.085 |
| 2014/0304756 A1* | 10/2014 | Fletcher ........... H04N 21/26258 725/115 |
| 2016/0239350 A1* | 8/2016 | Kamawat ............ G06F 11/1425 |
| 2018/0136931 A1 | 5/2018 | Hendrich et al. |

(Continued)

OTHER PUBLICATIONS

"Dataminer Solution Sheet" Broadcast Master Control Room, MCR and NOC Automation and Orchestration pp. 1-6.

(Continued)

*Primary Examiner* — James R Sheleheda
(74) *Attorney, Agent, or Firm* — Farjami & Farjami LLP

(57) ABSTRACT

A system includes a computing platform having processing hardware and a memory storing software code, a workstation database, and a station database. When executed, the software code receives workflow data describing a workflow for a station, obtains from the station database, using the workflow data, a configuration data for execution of the workflow by the station, and identifies, using the configuration data, multiple application programming interfaces (APIs). The software code further identifies, using the workstation database, a workstation for use by the station to execute the workflow, configures, using the configuration data, the workstation for execution of the workflow, and translates, during execution of the workflow, communications among the station and the multiple APIs into a common communication protocol.

20 Claims, 5 Drawing Sheets

(56) References Cited

U.S. PATENT DOCUMENTS

2018/0367363 A1* 12/2018 Jaeger ................... H04L 41/02
2020/0396121 A1   12/2020 Kumar et al.
2021/0136121 A1*  5/2021 Crabtree ............ H04L 63/1433
2023/0078252 A1*  3/2023 Lucca ................ H04N 21/4431
                                                        709/231

OTHER PUBLICATIONS

"Gallium Playout Multi-Channel Automation" PixelPower. A Rhode & Schwarz Company pp. 1-2.
"Gallium Workflow Orchestration" PixelPower. A Rhode & Schwarz Company pp. 1-2.
"Orchestration—The Next Generation of Automation" Software Broadcast Infrastructure. The___Bridge Connecting IT to Broadcast pp. 1-5.

* cited by examiner

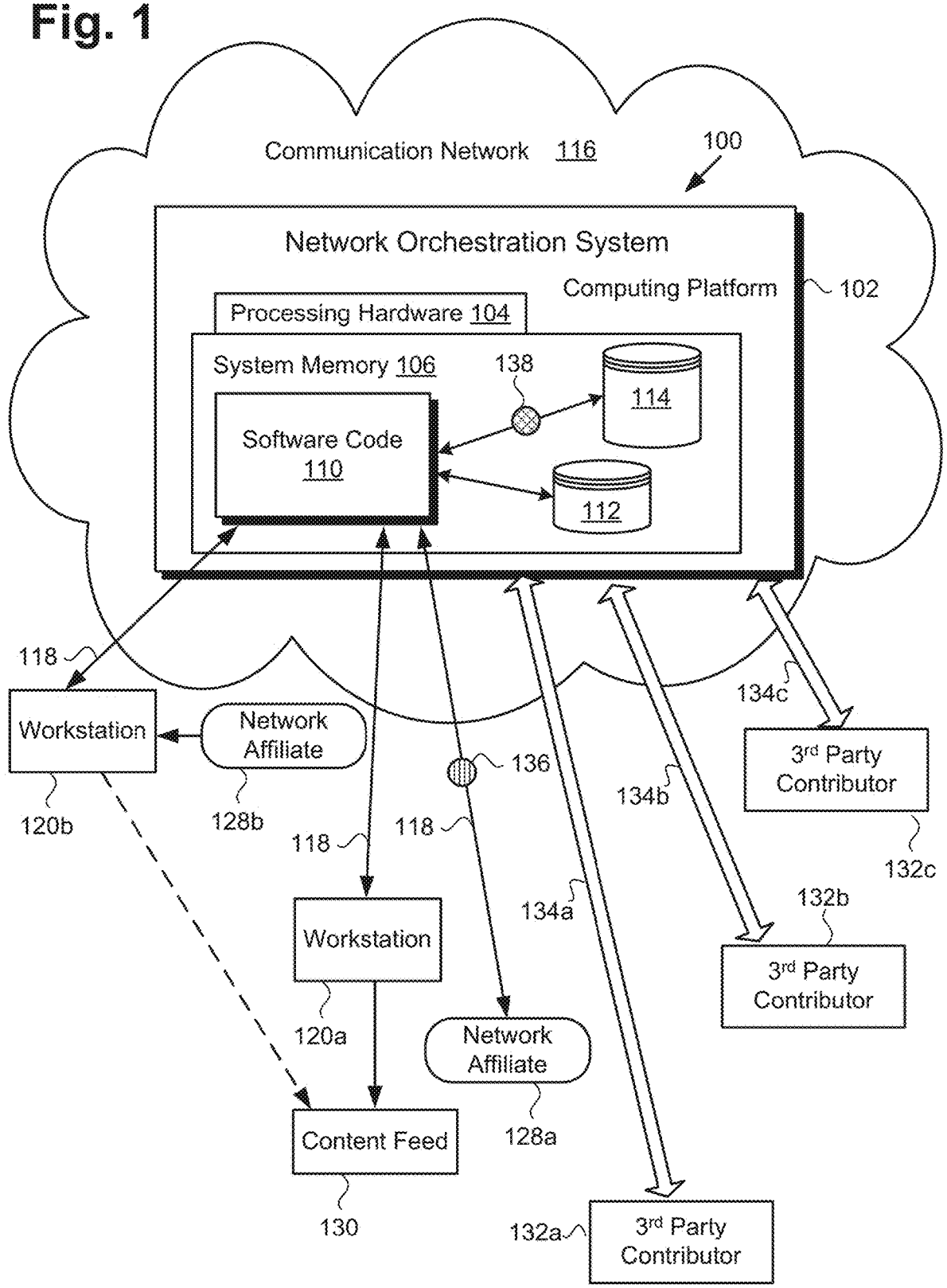

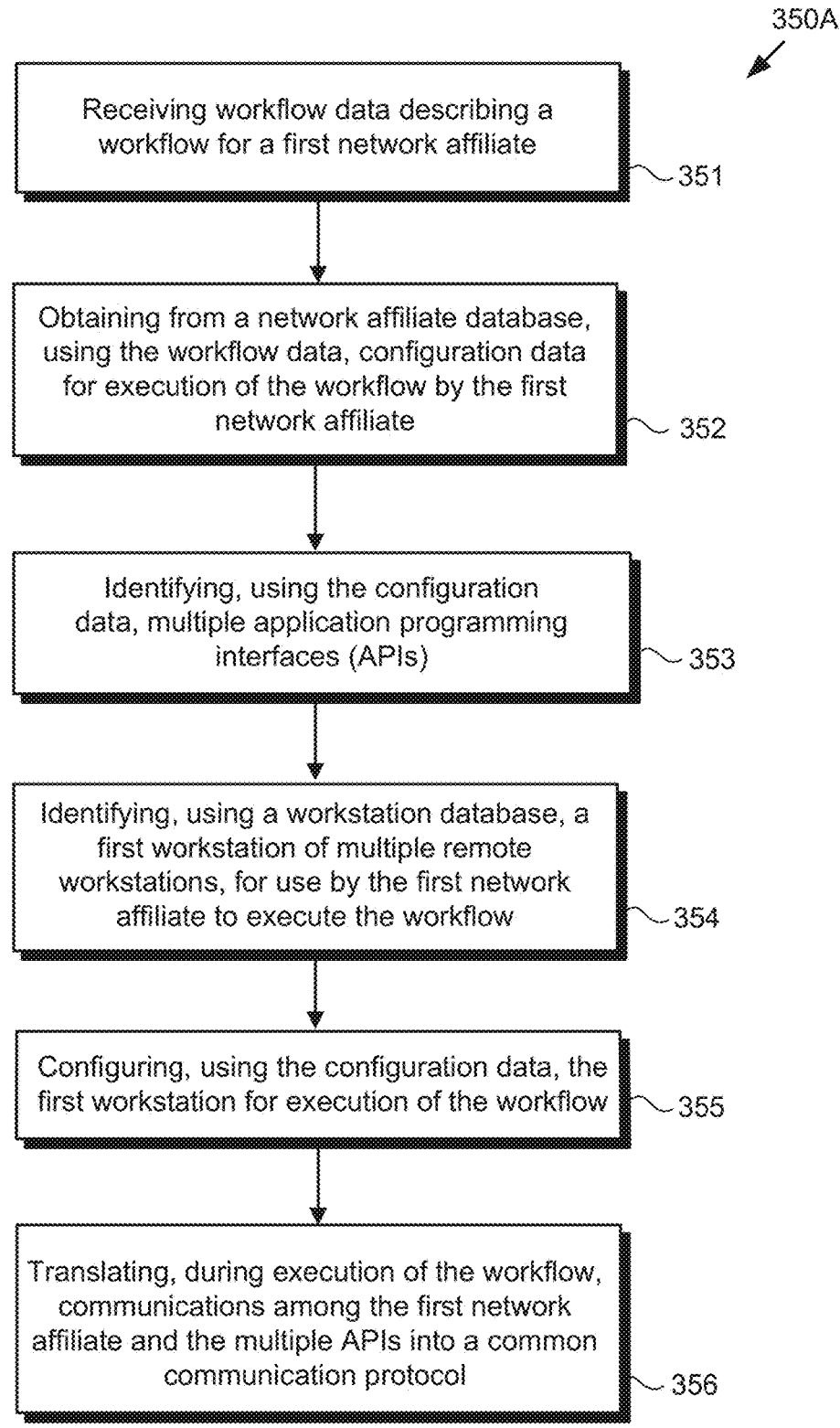

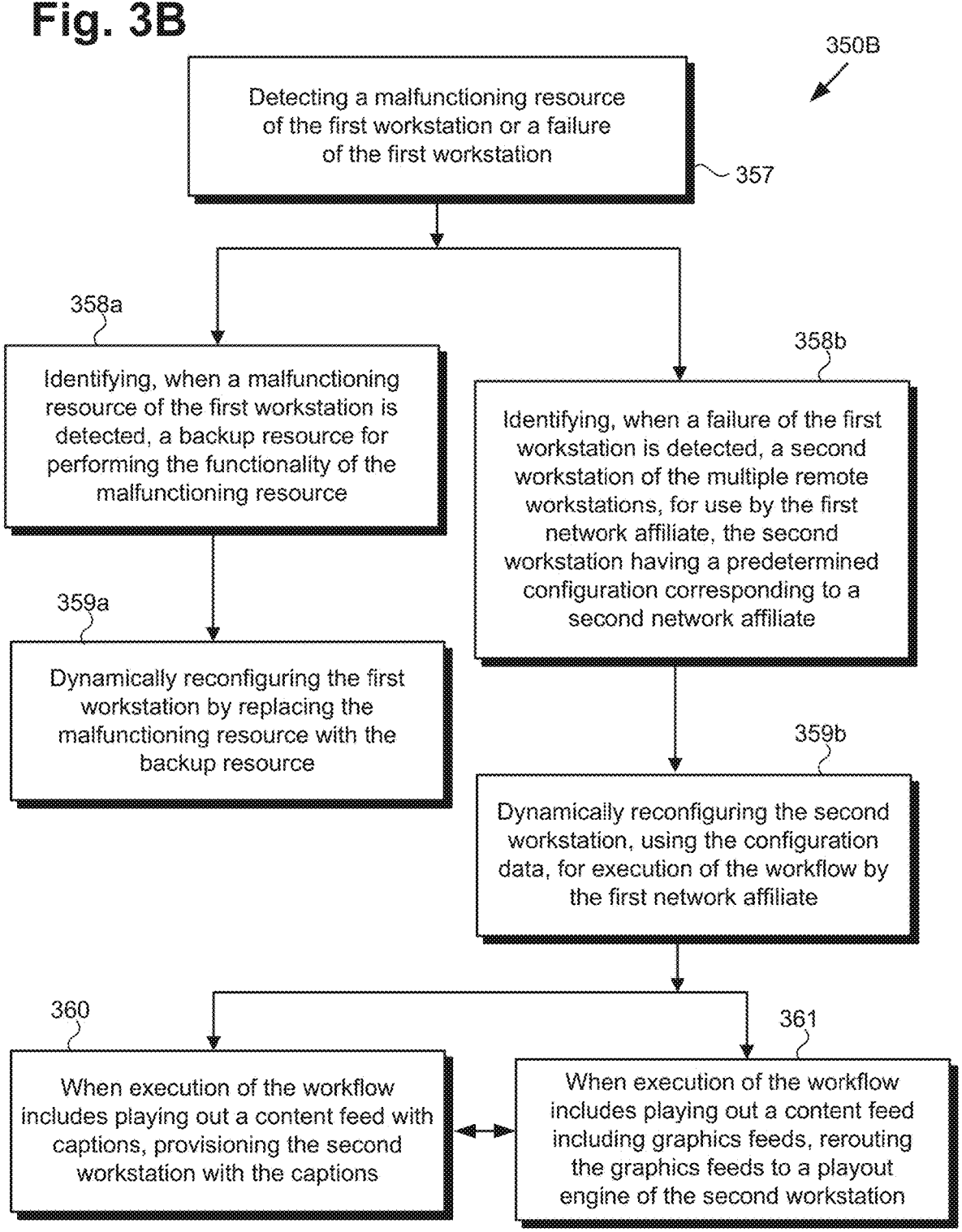

AUTOMATED NETWORK ORCHESTRATION

BACKGROUND

A content distribution network, such as a network for broadcasting or streaming content for example, may include many network affiliates each having its own dedicated workstation where a human operator monitors inputs and outputs of a particular content channel. Traditionally, such an arrangement is inflexible and can make the mitigation or correction of malfunctions at a workstation difficult if not impossible to perform in real-time. For example, a traditional response to a failure or malfunction at a workstation typically requires contacting the human operator of the workstation by telephone, and may include having the human operator manually reroute up to thousands of video feeds. Moreover, each network affiliate may be serviced by multiple third party vendors, which may differ from one affiliate to another. As a result, a fail-over scenario in which a workstation needs to be relocated or have its functionality assigned to another workstation generates significant logistical complexity due to these vendor dependencies.

BRIEF DESCRIPTION OF THE DRAWINGS

FIG. 1 shows a diagram of an exemplary system for performing automated network orchestration, according to one implementation;

FIG. 3A shows a flowchart outlining an exemplary method for performing automated network orchestration, according to one implementation; and FIG. 3B shows a flowchart outlining exemplary additional actions for extending the method outlined in FIG. 3A.

DETAILED DESCRIPTION

Figure 2A:
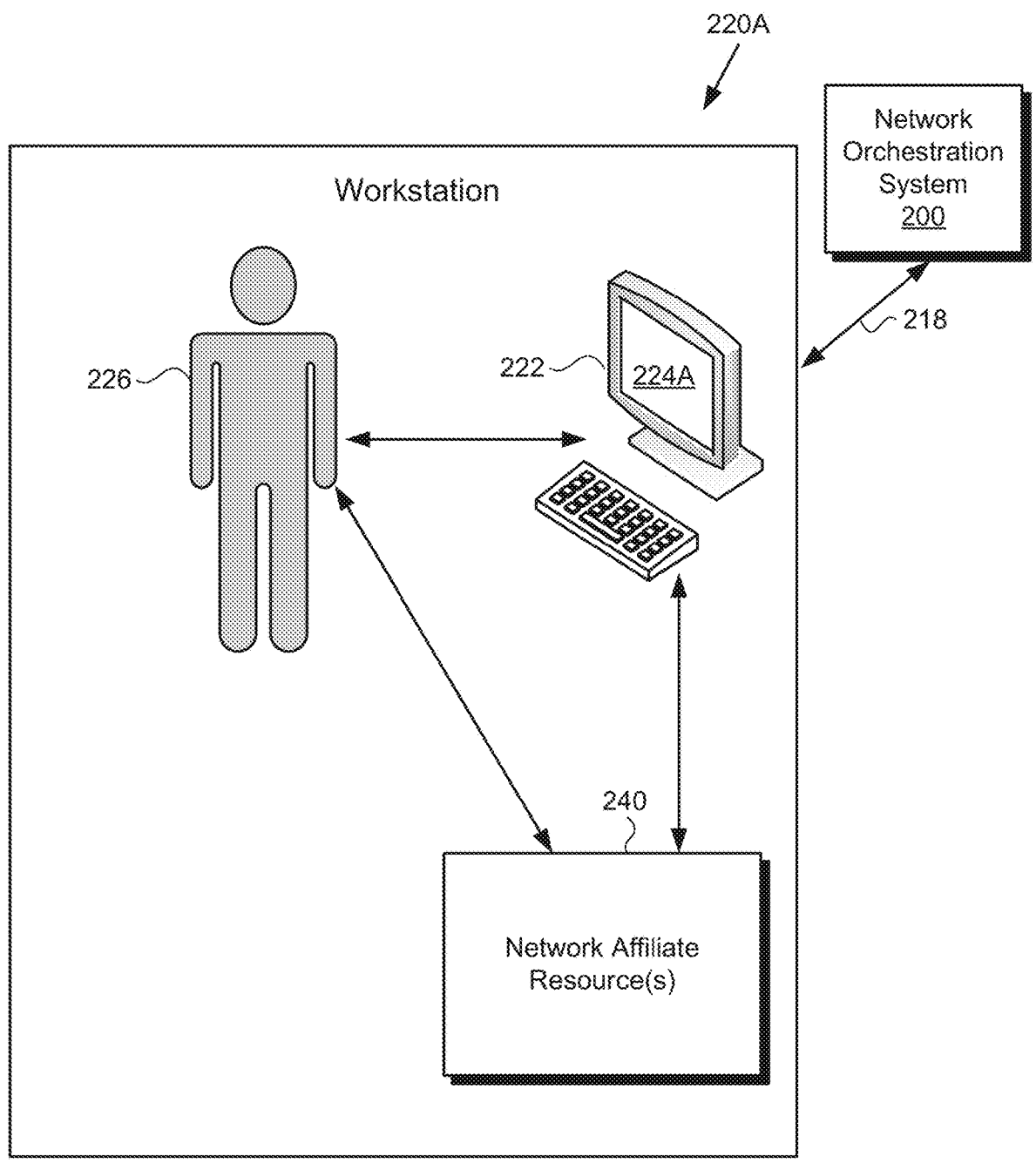
FIG. 2A shows a diagram of an exemplary network affiliate workstation in communication with the network orchestration system shown in FIG. 1, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing network orchestration that overcome the drawbacks and deficiencies in the conventional art. It is noted that in the field of broadcasting, a station that carries a particular network's programming is often referred to as an "affiliate," "network affiliate," or "affiliated station." Thus, for the purposes of the present application, the term "station" and the expression "network affiliate" may be used interchangeably. It is further noted that the content distributed by the network and network affiliates described in the present application may include audio-video (AV) content in the form of live feeds, video games, movies, or episodic television (TV) content that includes episodes of TV shows that are broadcast, streamed, or otherwise available for download or purchase on the Internet or via a user application. It is also noted that the network orchestration solution disclosed herein may advantageously be performed as an automated process, where "orchestration" is the act of harmonizing contributions of different participants to a content distribution process.

As defined in the present application, the terms "automation," "automated," and "automating" refer to systems and processes that do not require the participation of a human user, such as a human system administrator. For example, although in some implementations a human system administrator may review the performance of the systems and methods disclosed herein, that human involvement is optional. Thus, the processes described in the present application may be performed under the control of hardware processing components of the disclosed systems.

Furthermore, as defined in the present application, the feature "communication protocol" refers to a set of rules governing the exchange of information between computing systems. Thus, a communication protocol may specify the syntax, semantics, and synchronization used to exchange information, as well as, in some cases, methods for performing error recovery.

FIG. 1 shows an exemplary system for performing automated network orchestration, according to one implementation. As shown in FIG. 1, network orchestration system 100 includes computing platform 102 having processing hardware 104 and system memory 106 implemented as a computer-readable non-transitory storage medium. According to the present exemplary implementation, system memory 106 stores software code 110, workstation database 112, and network affiliate database 114.

As further shown in FIG. 1, network orchestration system 100 is implemented within a use environment including communication network 116, workstations 120a and 120b, network affiliate 128a, network affiliate 128b utilizing workstation 120b, and third party contributors 132a, 132b, and 132c such as third party vendors of services providing support for workflows executed using workstations 120a and 120b. In addition, FIG. 1 shows network communication links 118 communicatively coupling network affiliate 128a and workstations 120a and 120b with network orchestration system 100 via communication network 130, as well as application programming interfaces (APIs) 134a, 134b, and 134c supporting communications between network orchestration system 100 and respective third party contributors 132a, 132b, and 132. Also shown in FIG. 1 are content feed 130, workflow data 136, and configuration data 138.

It is noted that workstations 120a and 120b may be remote from one another, as well as remote from network orchestration system 100. It is further noted that although FIG. 1 depicts two workstations 120a and 120b, and two network affiliates 128a and 128b, that representation is provided merely in the interests of conceptual clarity. More generally, network orchestration system 100 may be communicatively coupled to more than two workstations and more than two network affiliates, such as tens, hundreds, or thousands of workstations and network affiliates. Moreover, although FIG. 1 shows an exemplary implementation in which the number of network affiliates equals the number of workstations, that representation is also merely exemplary. In some use cases, the interests of having backup resources for fail-over scenarios may make it advantageous or desirable for the number of workstations to exceed the number of network affiliates. However, in view of the dynamic and on-the-fly reconfiguration enabled by the present network orchestration solution, in some implementations, more than one network affiliate may share the same workstation infrastructure. That is to say, in some use cases, the number of network affiliates may exceed the number of workstations.

Content feed 130 may include AV content in the form of a video game, a movie, or episodic programming content including streamed episodic content or broadcasted episodic content, for example. Content feed 130 may include a high-definition (HD) or ultra-HD (UHD) baseband video signal with embedded audio, captions, timecode, and other ancillary content and metadata, such as ratings and parental guidelines. In some implementations, content feed 130 may be provided by workstation 120a, for example, utilized by a network affiliate of a TV broadcast network or other media distribution entity (e.g., a movie studio, a streaming platform, etc.), utilizing secondary audio programming (SAP) or Descriptive Video Service (DVS), for example. Moreover, in some implementations, content feed 130 may be or include a live feed, may have an associated graphics feed, or may be or include a live feed as well as have an associated graphics feed.

With respect to the representation of network orchestration system 100 shown in FIG. 1, it is noted that although software code 110, workstation database 112, and network affiliate database 114 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

It is further noted that although FIG. 1 depicts software code 110, workstation database 112, and network affiliate database 114 as being mutually co-located in system memory 106, that representation is also merely provided as an aid to conceptual clarity. More generally, network orchestration system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within network orchestration system 100. Thus, it is to be understood that software code 110, workstation database 112, and network affiliate database 114 may be stored remotely from one another within the distributed memory resources of network orchestration system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, network orchestration system 100 may be implemented virtually, such as in a data center. For example, in some implementations, network orchestration system 100 may be implemented in software, or as virtual machines.

FIG. 2A shows a diagram of an exemplary network affiliate workstation in communication with the network orchestration system shown in FIG. 1, according to one implementation. As shown in FIG. 2A, workstation 220A includes workstation terminal 222 having display 224A, one or more network affiliate resources 240 (hereinafter "network affiliate resource(s) 240"), and human operator 226 of workstation 220A. Also shown in FIG. 2A are network orchestration system 200 communicatively coupled to workstation 220A via network communication link 218.

Network affiliate resource(s) 240 may include a variety of hardware and software resources supporting the operation of workstation 220A. By way of examples, network affiliate resource(s) 240 may include one or more servers, one or more routers, one or more switchers, one or more software applications for execution by workstation 220A, and a telephone system, to name a few.

Although workstation terminal 222 is shown as a desktop computer in FIG. 2A, that representation is provided merely as an example. More generally, workstation terminal 222 may be any suitable mobile or stationary computing device or system that implements data processing capabilities sufficient to provide a user interface, support connections to communication network 116 in FIG. 1, and implement the functionality attributed to workstation terminal 222 herein. For example, in some implementations, workstation terminal 222 may take the form of a laptop computer, tablet computer, or smartphone, for example. However, in other implementations workstation terminal 222 may be a "dumb terminal" peripheral component of network orchestration system 200 that enables human operator 126 to provide inputs via a keyboard or other input device, as well as to view various network affiliate feeds on display 224A. In those implementations, workstation terminal 222 and display 224A may be controlled by processing hardware 104 in FIG. 1.

With respect to display 224A of workstation terminal 222, display 224A may be physically integrated with workstation terminal 222 or may be communicatively coupled to but physically separate from workstation terminal 222. For example, where workstation terminal 222 is implemented as a smartphone, laptop computer, or tablet computer, display 224A will typically be integrated with workstation terminal 222. By contrast, where workstation terminal 222 is implemented as a desktop computer, display 224A may take the form of a monitor separate from workstation terminal 222 in the form of a computer tower. Moreover, display 224A may be implemented as a liquid crystal display (LCD), light-emitting diode (LED) display, organic light-emitting diode (OLED) display, quantum dot (QD) display, or any other suitable display screen that performs a physical transformation of signals to light.

Workstation 220A corresponds in general to either or both of workstations 120a and 120b, in FIG. 1. That is to say, workstations 120a and 120b may share any of the characteristics attributed to workstation 220A by the present disclosure, and vice versa. Thus, although not shown in FIG. 1, each of workstations 120a and 120b may include features corresponding to workstation terminal 222 having display 224A, and network affiliate resource(s) 240, and each may be manned by a human operator corresponding to human operator 226. Moreover, network orchestration system 200 and network communication link 218, in FIG. 2A, correspond respectively in general to network orchestration system 100 and network communication links 118, in FIG. 1. Consequently, network orchestration system 200 and network communication links 218 may share any of the characteristics attributed to respective network orchestration system 100 and network communication links 118 by the present disclosure, and vice versa.

Figure 2B:
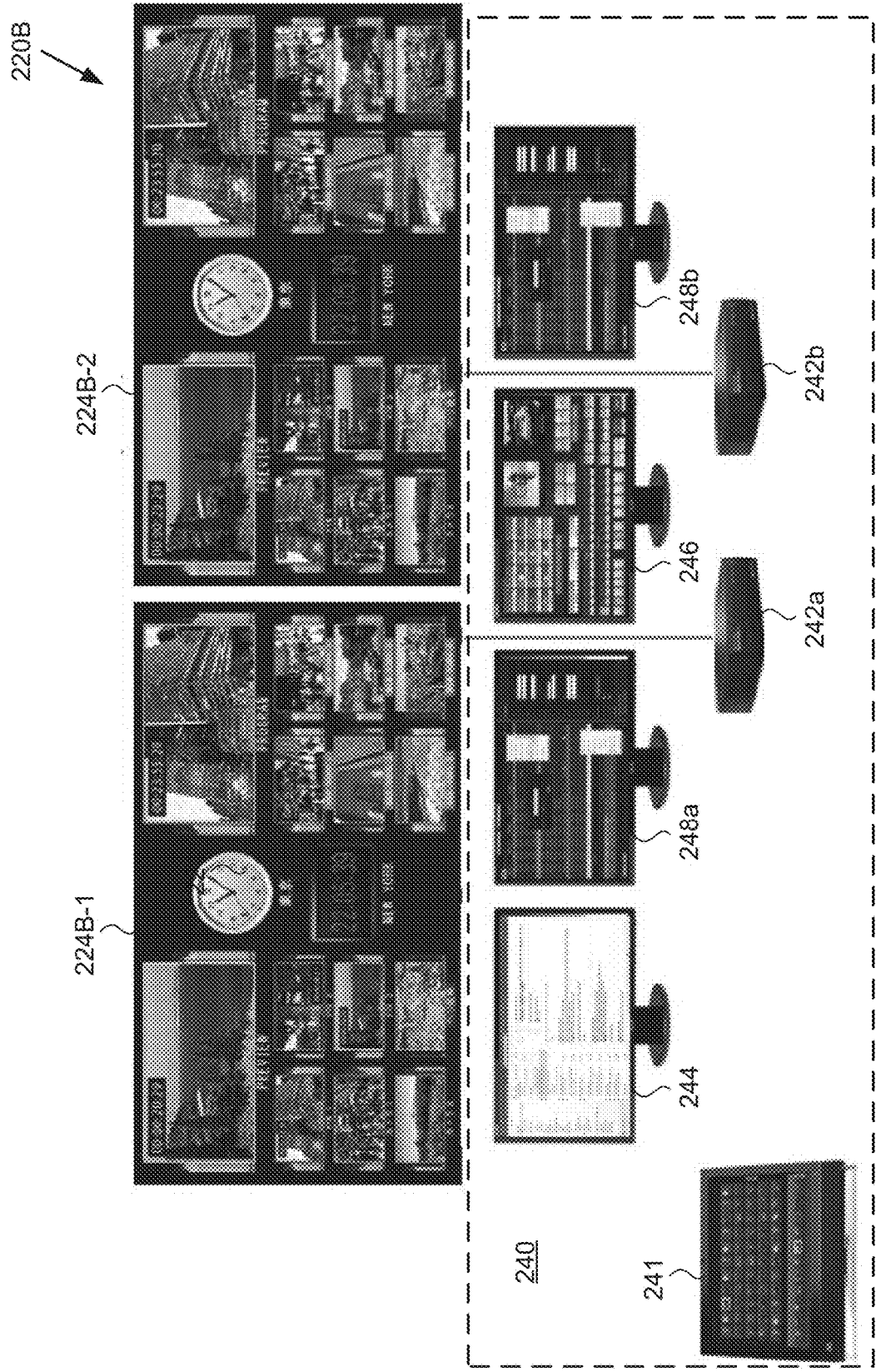
FIG. 2B shows a more detailed exemplary representation of the network affiliate workstation shown in FIG. 2A, according to one implementation.

FIG. 2B shows a more detailed exemplary representation of a network affiliate workstation, according to one implementation. As shown in FIG. 2B, workstation 220B includes multiple displays 224B-1 and 224B-2, and network affiliate resource(s) 240. As further shown in FIG. 2B, network affiliate resource(s) 240 may include one or more of telephone system 241, one or more content playout engines 242a and 242b, automation screen 244, router controls 246, and miscellaneous additional resources 248a and 248b.

Workstation 220B corresponds in general to workstation 220A, in FIG. 2A, as well as to either or both of workstations 120a and 120b, in FIG. 1. That is to say, workstations 120a, 120b, and 220A may share any of the characteristics attributed to workstation 220B by the present disclosure, and vice versa. Thus, although not shown in FIGS. 1 and 2A, each of workstations 120a, 120b, and 220A may include features corresponding to multiple displays 224B-1 and 224B-2, telephone system 241, one or more content playout engines 242a and 242b, automation screen 244, router controls 246, and miscellaneous additional resources 248a and 248b. Moreover, each of displays 224B-1 and 224B-2, in FIG. 2B, corresponds in general to display 224A, in FIG. 2A. Consequently, each of displays 224B-1 and 224B-2 may share any of the characteristics attributed to display 224A by the present disclosure, and vice versa. Thus, either or both of displays 224B-1 and 224B-2 may be implemented as LCDs, LED displays, OLED displays. QD displays, or any other suitable display screen that performs a physical transformation of signals to light.

The functionality of network orchestration system 100/200 and software code 110 will be further described by reference to FIG. 3A. FIG. 3A shows flowchart 350A presenting an exemplary method for performing automated network orchestration, according to one implementation. With respect to the method outlined in FIG. 3A, it is noted that certain details and features have been left out of flowchart 350A in order not to obscure the discussion of the inventive features in the present application.

As a preliminary matter, and by way of overview, it is noted that one of the objectives of network orchestration is to be agnostic to the specific third party contributors. e.g., vendors, providing services in support of a particular network affiliate. According to the network orchestration solution disclosed in the present application, software code 110 effectively provides an abstraction layer that sits between network affiliate workstations and third party contributors, and that advantageously allows any network affiliate to utilize any third party contributor, workstation, or workflow. That abstraction layer automatically provisions the resources associated with a given network affiliate. As one example, network orchestration system 100/200 can push the new phone number for the location to which a particular workstation has moved automatically in response to the move, as opposed to requiring a hardwired change as is typical in the conventional art. Such automatic allocation or reassignment of resources saves a significant amount of time, as any changes can be made substantially instantaneously. In addition, network orchestration system 100/200 can detect the malfunction of a workstation resource, or a workstation failure, and can automatically switch to another workstation, thereby eliminating or substantially reducing the need for human intervention in response to a fail-over scenario.

The abstraction layer instantiated by software code 110 can monitor network events, broker communications via third party contributor APIs, and bridge workflows between workstations using disparate network affiliate resources. As noted above, traditionally, workstations were static and dedicated exclusively to a specific affiliate. By contrast, the network orchestration solution disclosed herein confers the flexibility to control a network (or multiple networks) from any location, and have all of the resources for that network automatically allocated to that location. The network orchestration solution disclosed in the present application also reacts to failure or fail-over scenarios where captioning and other resources can be automatically routed to a different playout engine of a different workstation. The present network orchestration solution also has the ability to automatically change downstream routes as primary or backup resources change or fail. Having this real-time reaction reduces downtime and, as noted above, substantially reduces or eliminates the need for human intervention, thereby also reducing or eliminating the potential for human error. Furthermore, the ability conferred by the present network orchestration solution to proactively and dynamically allocate resources in the event of component failure can eliminate the long and complex process of manually setting up a new workstation for a particular network affiliate. That is to say, the network orchestration solution disclosed in the present application enables the substantially seamless movement of network affiliate workstations around fail-over to any other available workstation while requiring only minimal manual configuration, or requiring no manual configuration at all.

Network orchestration system 100/200 can be implemented so as to allow fabrics and control to be seamlessly extended into cloud infrastructures, remote locations, or both, based on any desired workflow. Software code 110 includes forensics and diagnostics capabilities for monitoring the present state of every resource utilized in any given workflow, which allows for the substantially immediate logging and reporting of errors or inconsistencies. In addition, software code 110 enhances network security by enabling the authoring of rules for brokering access to and control of workstations and network affiliate resources.

The ability, provided by the present network orchestration solution, to modify or create custom workflows without writing or rewriting main applications is also highly advantageous. That is to say, according to the present solution, even after a workflow has been established, changing components and functionality is very simple and does not require a complete rewrite of the workflow. Changes can be made as simply as by replacing one resource by another in the existing workflow pipeline. Moreover, the ability of software code 110 to perform API mapping allows network affiliates to change third party contributors and underlying APIs without having to modify control applications.

Referring now to FIG. 3A in combination with FIG. 1, flowchart 350A may begin with receiving workflow data 136 describing a workflow for a first network affiliate (hereinafter "network affiliate 128*a*") (action 351). Referring to the exemplary implementation shown in FIG. 1, workflow data 136 describes the workflow of network affiliate 128*a*. Workflow data 136 may include data identifying network affiliate 128*a*, the objective of the workflow (e.g., providing content feed 130), the types of resources required by the workflow, and the third party contributors providing services in support of the workflow, to name a few examples. As shown in FIG. 1, workflow data 136 may be received from network affiliate 128*a* in action 351, by software code 110, executed by processing hardware 104 of network orchestration system 100.

Flowchart 350A further includes using workflow data 136 to obtain configuration data 138 for execution of the workflow by network affiliate 128*a*, from network affiliate database 114 (action 352). Referring to FIGS. 2A and 2B in combination with FIG. 1, configuration data 138 may include the specific network affiliate resource(s) 240 required by the workflow described by workflow data 136, as well as data describing the respective APIs used by each third party contributor participating in that workflow, for example. As further shown in FIG. 1, configuration data 138 may be obtained from network affiliate database 114 in action 352 by software code 110, executed by processing hardware 104 of network orchestration system 100.

Flowchart 350A further includes identifying, using the configuration data, multiple APIs (action 353). For example, in some implementations, action 353 may include identifying the multiple APIs corresponding respectively to the third party contributors to the workflow described by workflow data 136. By way of further example, where the objective of the workflow described by workflow data 136 is providing content feed 130 and the workflow includes the participation of third party contributors 132*a* and 132*b*, action 353 includes identifying respective APIs 134*a* and 134*b*. Action 353 may be performed by software code 110, executed by processing hardware 104 of network orchestration system 100.

Flowchart 350A further includes identifying, using workstation database 112, a first workstation (hereinafter "workstation 120*a*") of multiple remote workstations 120*a* and 120*b*, for use by first network affiliate 128*a* to execute the workflow described by workflow data 136 (action 354). Workstation database 112 may include a registry of all workstations 120*a* and 120*b*, their present configurations, and whether or not each is presently executing a workflow or otherwise being used by a network affiliate. Thus, action 354 may include identifying workstation 120*a* as a workstation previously used by network affiliate 128*a*, a workstation not previously used by network affiliate 128*a* but presently not in use, or a workstation presently in use but executing a lower priority workflow than the workflow described by workflow data 136. Identification of workstation 120*a* in action 354 may be performed by software code 110, executed by processing hardware 104 of network orchestration system 100.

With respect to actions 353 and 354 described above, it is noted that although flowchart 350A shows action 353 as preceding action 354, that representation is provided merely by way of example. In other implementations, action 354 may precede action 353, while in yet other implementations, actions 353 and 354 may be performed in parallel, i.e., substantially concurrently.

Flowchart 350A further includes configuring, using configuration data 358, workstation 120*a* for execution of the workflow described by workflow data 136 (action 355). As noted above, configuration data 138 may include the specific network affiliate resource(s) 240 required by the workflow described by workflow data 136, as well as data describing the respective APIs used by each third party contributor participating in that workflow, for example. Action 355 may include provisioning workstation 128*a* with network affiliate resource(s) 240, i.e., software and hardware resource(s), required for execution, by network affiliate 128*a*, of the workflow described by workflow data 136. Moreover, action 355 may further include generating mappings among API 134*a*, API 134*b*, and network affiliate resource(s) 240 required by the workflow described by workflow data 136, in order to enable communications among network affiliate resource(s) 240 and participating third party contributors 132*a* and 132*b*. Configuration of workstation 120*a* in action 355 may be performed by software code 110, executed by processing hardware 104 of network orchestration system 100.

Flowchart 350A further includes translating, during execution of the workflow described by workflow data 136, communications among network affiliate 128*a*. API 134*a*, and API 134*b* into a common communication protocol (action 356). It is noted that execution of action 356 advantageously automates interoperability among network affiliate 128*a* and third party contributors 132*a* and 132*b*. In some use cases, executing the workflow described by workflow data 136 may include playing out content feed 130 as one or both of a content broadcast and a content stream. Moreover, in some implementations, a content broadcast included in content feed 130, a content stream included in content feed 130, or both, may include a live feed. Translation of communications among network affiliate 128*a*. API 134*a*, and API 134*b* into a common communication protocol during execution of the workflow described by workflow data 136 may be performed by software code 110, executed by processing hardware 104 of network orchestration system 100.

In some implementations, flowchart 350A may conclude with action 356 described above. However, in other implementations, the method outlined in FIG. 3A may include additional actions. Referring to FIG. 3B. FIG. 3B shows flowchart 350B outlining exemplary additional actions for extending the method outlined in FIG. 3A. With respect to the actions described in FIG. 3B, it is noted that certain details have been left out of flowchart 350B in order not to obscure the discussion of the inventive features in the present application. It is further noted that the actions included in flowchart 350B are described below by reference to the exemplary scenario introduced above in which the first network affiliate is network affiliate 128*a*, the first workstation used by network affiliate 128*a* to execute the workflow described by workflow data 136 is workstation 120*a*, that workflow provides content feed 130, and third party contributors 132*a* and 132*b* are participants in execution of that workflow.

Referring now to FIG. 3B in combination with FIG. 1, flowchart 350B may begin with detecting a malfunctioning resource of workstation 120*a* or a failure of workstation 120*a* (action 357). As noted above, network orchestration system 100 includes forensics and diagnostics capabilities for monitoring the present state of every resource utilized in any given workflow, which allows for the substantially immediate logging and reporting of errors, inconsistencies, and failures. Thus, detection of the malfunctioning resource or workstation failure in action 357 may be performed by software code 110, executed by processing hardware 104 of network orchestration system 100.

In use cases in which a malfunctioning resource of workstation 120*a* is detected in action 357, flowchart 350B may further include identifying, using network affiliate database 114, a backup resource for performing the functionality of the malfunctioning resource (action 358*a*). As noted above by reference to FIGS. 2A and 2B, network affiliate resource(s) 240 may include one or more hardware, one or more software resources, or hardware and software resources. Based on the operations assigned to the malfunctioning resource identified in action 357, action 358*a* may include finding a suitable substitute or replacement resource for use in executing the workflow described by workflow data 136. Action 358*a* may be performed by software code 110, executed by processing hardware 104 of network orchestration system 100.

In use cases in which the malfunctioning resource of workstation 120*a* is detected in action 357, flowchart 350B may further include dynamically reconfiguring workstation 120*a* by replacing the malfunctioning resource with the backup resource identified in action 358*a* (action 359*a*). As noted above, in some use cases the malfunctioning resource of workstation 120*a* may be one of network affiliate resource(s) 240. However, in other use cases the malfunctioning resource may correspond to underperformance or failure by one of third party contributors 132*a* or 132*b* (e.g., third party contributor 132*a*). In those latter use cases, the backup resource identified in action 358*b* may be an alternate third party contributor using another API (e.g., third party contributor 132*c* using API 134*c*). Moreover, in those use cases, dynamically reconfiguring workstation 120*a* may include switching from third party contributor 132*a* to third party contributor 134*c* and may result in translation of communications from API 134*c* into the common communication protocol being used for communications among network affiliate 128*a* and third party contributor 134*b*. Action 359*a* may be performed by software code 110, executed by processing hardware 104 of network orchestration system 100.

Alternatively, in use cases in which failure of workstation 120*a* is detected in action 357, flowchart 350B may further include identifying, using workstation database 112, a second workstation (hereinafter "workstation 120*b*") of remote workstations 120*a* and 120*b*, for use by network affiliate 128*a*, workstation 120*b* having a predetermined configuration corresponding to a second network affiliate (hereinafter "network affiliate 128*b*") (action 358*b*). In various use cases, workstation 120*b* may have previously been used by network affiliate 128*b* to execute a workflow, or may presently be in use by network affiliate 128*b* executing a lower priority workflow than the workflow described by workflow data 136. Action 358*b* may be performed by software code 110, executed by processing hardware 104 of network orchestration system 100.

In use cases in which failure of workstation 120*a* is detected in action 357, flowchart 350B may further include dynamically reconfiguring workstation 120*b*, using configuration data 138, for execution of the workflow described by workflow data 136 by network affiliate 128*a* (action 359*b*). As noted above, configuration data 138 may include the specific network affiliate resource(s) 240 required by the workflow described by workflow data 136, as well as data describing the respective APIs used by each third party contributor participating in that workflow, for example. Action 359*b* may include provisioning workstation 128*b* with network affiliate resource(s) 240, i.e., hardware resource(s), software resource(s), or hardware and software resources, required for execution, by network affiliate 128*a*, of the workflow described by workflow data 136. Moreover, action 359*b* may further include generating mappings among API 134*a*, API 134*b*, and network affiliate resource(s) 240 on reconfigured workstation 120*b* in order to enable communication among workstation 120*b* and participating third party contributors 132*a* and 132*b*. Reconfiguration of workstation 120*b* in action 359*b* may be performed by software code 110, executed by processing hardware 104 of network orchestration system 100.

In use cases in which execution of the workflow described by workflow data 136 includes providing content feed 130 including ancillary content in the from of one or more of captions, such as closed captions for example, and graphics feeds, reconfiguration of workstation 120*b* in action 359*b* may not be sufficient to transfer that ancillary content to workstation 120*b*. In those use cases, flowchart 350B may include one of provisioning second workstation 120*b* with the captions (action 360) or rerouting the graphics feeds to a playout engine of workstation 120*b* (action 361), or both of provisioning second workstation 120*b* with the captions (action 360) and rerouting the graphics feeds to a playout engine of workstation 120*b* (action 361), as designated by the double-headed arrow therebetween. Action 360, or action 361, or actions 360 and 361 may be performed by software code 110, executed by processing hardware 104 of network orchestration system 100.

With respect to the actions listed in flowchart 350B, it is noted that in various use cases, the extended method outlined in FIG. 3 may conclude with any of actions 359*a*, 359*b*, 360, or 361. In addition, in some implementations in which action 361 is performed, action 360 may be omitted. Moreover, in use cases in which actions 359*b* and 360, or actions 359*b* and 361, or actions 359*b*, 360, and 361 are performed, those actions may be performed in any order. Alternatively, in those implementations, any two or more of actions 359*b*. 360, and 361 may be performed in parallel, i.e., substantially concurrently.

With respect to the method outlined by flowcharts 350A and extended by flowchart 350B, it is noted that actions 351, 352, 353, 354, and actions 355, 356, and 357 (hereinafter actions "355-357"), or actions 351, 352, 353, 354, 355-357, 358*a*, and 359*a*, or actions 351, 352, 353, 354, 355-357, 358*b*, and 359*b*, or actions 351, 352, 353, 354, 355-357, 358*b*, 359*b*, and 360, or actions 351, 352, 353, 354, 355-357, 358*b*, 359*b*, and 361, or actions 351, 352, 353, 354, 355-357, 358*b*, 359*b*, 360, and 361 may be performed in an automated process from which human participation may be omitted.

Thus, the present application discloses systems and methods for automated network orchestration that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a processing hardware and a system memory storing a software code, a workstation database, and a network affiliate database;
the processing hardware configured to execute the software code to:
receive a workflow data describing a workflow for a first network affiliate of a plurality of network affiliates of a content distribution network, the workflow data including data identifying the first network affiliate, an objective of the workflow, one or more resources required by the workflow, and one or more third party contributors providing services in support of the workflow;
obtain from the network affiliate database, using the workflow data, a configuration data for execution of the workflow by the first network affiliate;
identify, using the configuration data, a plurality of application programming interfaces (APIs);
identify, using the workstation database, a first workstation of a plurality of remote workstations, for use by the first network affiliate to execute the workflow;
configure, using the configuration data, the first workstation for execution of the workflow by the first network affiliate, wherein configuring the first workstation includes provisioning the first workstation with the one or more resources including at least one of a software resource or a hardware resource required for execution of the workflow by the first network affiliate; and
translate, during execution of the workflow by the first network affiliate, communications among the first network affiliate and the plurality of APIs into a common communication protocol.

2. The system of claim 1, wherein executing the workflow comprises playing out at least one of a content broadcast or a content stream being the objective of the workflow.

3. The system of claim 2, wherein the at least one of the content broadcast or the content stream comprises a live feed.

4. The system of claim 1, wherein the processing hardware is further configured to execute the software code to:
detect a malfunctioning resource of the first workstation;
identify, using the network affiliate database, a backup resource for performing the functionality of the malfunctioning resource; and
dynamically reconfigure the first workstation by replacing the malfunctioning resource with the backup resource.

5. The system of claim 4, wherein the malfunctioning resource comprises the one or more third party contributors to the workflow, wherein the backup resource is an alternate third party contributor using another API, and wherein dynamically reconfiguring the first workstation results in translation of communications from the another API into the common communication protocol.

6. The system of claim 1, wherein the processing hardware is further configured to execute the software code to:
detect a failure of the first workstation;
identify, using the workstation database, a second workstation of the plurality of remote workstations, for use by the first network affiliate, the second workstation having a predetermined configuration corresponding to a second network affiliate of the plurality of network affiliates of the content distribution network, wherein the plurality of network affiliates of the content distribution network is greater than the plurality of remote workstations; and
dynamically reconfigure the second workstation, using the configuration data, for execution of the workflow by the first network affiliate.

7. The system of claim 6, wherein executing the workflow comprises playing out a content feed including one or more of captions or graphics feeds, and wherein the processing hardware is further configured to execute the software code to at least one of:
provision the second workstation with the captions; or
reroute the graphics feeds to a playout engine of the second workstation.

8. A method for use by a system including a computing platform having a processing hardware, and a system memory storing a software code, a workstation database, and a network affiliate database, the method comprising:
receiving, by the software code executed by the processing hardware, a workflow data describing a workflow for a first network affiliate of a plurality of network affiliates of a content distribution network, the workflow data including data identifying the first network affiliate, an objective of the workflow, one or more resources required by the workflow, and one or more third party contributors providing services in support of the workflow;
obtaining from the network affiliate database, by the software code executed by the processing hardware and using the workflow data, a configuration data for execution of the workflow by the first network affiliate;
identifying, by the software code executed by the processing hardware and using the configuration data, a plurality of application programming interfaces (APIs);
identifying, by the software code executed by the processing hardware and using the workstation database, a first workstation of a plurality of remote workstations, for use by the first network affiliate to execute the workflow;
configuring, by the software code executed by the processing hardware and using the configuration data, the first workstation for execution of the workflow by the first network affiliate, wherein configuring the first workstation includes provisioning the first workstation with the one or more resources including at least one of a software resource or a hardware resource required for execution of the workflow by the first network affiliate; and
translating, by the software code executed by the processing hardware during execution of the workflow by the first network affiliate, communications among the first network affiliate and the plurality of APIs into a common communication protocol.

9. The method of claim 8, wherein executing the workflow comprises playing out at least one of a content broadcast or a content stream.

10. The method of claim 9, wherein the at least one of the content broadcast or the content stream comprises a live feed.

11. The method of claim 8, further comprising:
detecting, by the software code executed by the processing hardware, a malfunctioning resource of the first workstation;
identifying, by the software code executed by the processing hardware and using the network affiliate database, a backup resource for performing the functionality of the malfunctioning resource; and
dynamically reconfiguring the first workstation, by the software code executed by the processing hardware, by replacing the malfunctioning resource with the backup resource.

12. The method of claim 11, wherein the malfunctioning resource comprises the one or more third party contributor to the workflow, wherein the backup resource is an alternate third party contributor using another API, and wherein dynamically reconfiguring the first workstation results in translation of communications from the another API into the common communication protocol.

13. The method of claim 8, further comprising:
detecting, by the software code executed by the processing hardware, a failure of the first workstation;
identifying, by the software code executed by the processing hardware and using the workstation database, a second workstation of the plurality of remote workstations, for use by the first network affiliate, the second workstation having a predetermined configuration corresponding to a second network affiliate of the plurality of network affiliates of the content distribution network, wherein the plurality of network affiliates of the content distribution network is greater than the plurality of remote workstations; and
dynamically reconfiguring the second workstation, by the software code executed by the processing hardware and using the configuration data, for execution of the workflow by the first network affiliate.

14. The method of claim 13, wherein executing the workflow comprises playing out a content feed including one or more of captions or graphics feeds, the method further comprising at least one of:
provisioning, by the software code executed by the processing hardware, the second workstation with the captions; or
rerouting, by the software code executed by the processing hardware, the graphics feeds to a playout engine of the second workstation.

15. A computer-readable non-transitory storage medium having stored thereon instructions, which when executed by a processing hardware of a system, instantiate a method comprising:
receiving a workflow data describing a workflow for a first network affiliate of a plurality of network affiliates of a content distribution network, the workflow data including data identifying the first network affiliate, an objective of the workflow, one or more resources required by the workflow, and one or more third party contributors providing services in support of the workflow;
obtaining from a network affiliate database, using the workflow data, a configuration data for execution of the workflow by the first network affiliate;
identifying, using the configuration data, a plurality of application programming interfaces (APIs);
identifying, using a workstation database, a first workstation of a plurality of remote workstations, for use by the first network affiliate to execute the workflow;
configuring, using the configuration data, the first workstation for execution of the workflow by the first network affiliate, wherein configuring the first workstation includes provisioning the first workstation with the one or more resources including at least one of a software resource or a hardware resource required for execution of the workflow by the first network affiliate; and
translating, during execution of the workflow by the first network affiliate, communications among the first network affiliate and the plurality of APIs into a common communication protocol.

16. The computer-readable non-transitory storage medium of claim 15, wherein executing the workflow comprises playing out at least one of a content broadcast or a content stream.

17. The computer-readable non-transitory storage medium of claim 16, wherein the at least one of the content broadcast or the content stream comprises a live feed.

18. The computer-readable non-transitory storage medium of claim 15, the method further comprising:
detecting a malfunctioning resource of the first workstation;
identifying, a backup resource for performing the functionality of the malfunctioning resource; and
dynamically reconfiguring the first workstation by replacing the malfunctioning resource with the backup resource.

19. The computer-readable non-transitory storage medium of claim 15, the method further comprising:
detecting a failure of the first workstation;
identifying, using the workstation database, a second workstation of the plurality of remote workstations, for use by the first network affiliate, the second workstation having a predetermined configuration corresponding to a second network affiliate of the plurality of network affiliates of the content distribution network, wherein the plurality of network affiliates of the content distribution network is greater than the plurality of remote workstations; and
dynamically reconfiguring the second workstation, using the configuration data, for execution of the workflow by the first network affiliate.

20. The computer-readable non-transitory storage medium of claim 19, wherein executing the workflow comprises playing out a content feed including one or more of captions or graphics feeds, the method further comprising at least one of:
provisioning the second workstation with the captions; or
rerouting the graphics feeds to a playout engine of the second workstation.

* * * * *